United States Patent [19]
Chang et al.

[11] 3,816,647
[45] June 11, 1974

[54] OPTICAL CORRELATION OF SCANNED REAL-TIME SIGNALS

[75] Inventors: Milton M. T. Chang, Fountain Valley; John T. McCrickerd, Hawthorne, both of Calif.

[73] Assignee: Northrop Corporation, Los Angeles, Calif.

[22] Filed: Apr. 5, 1972

[21] Appl. No.: 241,317

[52] U.S. Cl....... 178/6.8, 178/DIG. 1, 178/DIG. 36, 178/DIG. 37

[51] Int. Cl. ............................................ H04n 3/00

[58] Field of Search........ 356/71, 167; 340/146.3 E, 340/146.3 G, 146.3 P; 178/DIG. 1, DIG. 36, DIG. 37, 7.3 D, 6.8; 343/5 MM

[56] References Cited

UNITED STATES PATENTS

| | | | |
|---|---|---|---|
| 3,103,008 | 9/1963 | Mooney | 343/5 MM |
| 3,211,898 | 10/1965 | Fomenko | 340/146.3 G |
| 3,388,240 | 6/1968 | Robbins | 340/146.3 G |
| 3,409,872 | 11/1968 | Hogg et al. | 178/DIG. 1 |
| 3,666,359 | 5/1972 | Lee | 356/71 |
| 3,704,949 | 12/1972 | Thomas et al. | 356/71 |

FOREIGN PATENTS OR APPLICATIONS

| | | | |
|---|---|---|---|
| 1,188,302 | 4/1970 | Great Britain | 340/146.3 E |

OTHER PUBLICATIONS

Schuenzel et al., Credit Card System, IBM Tech. Disclosure Bulletin, Vol. 13, No. 1, pp. 176, 177.

*Primary Examiner*—Howard W. Britton
*Assistant Examiner*—Jin F. Ng
*Attorney, Agent, or Firm*—Edward A. Sokolski

[57] ABSTRACT

A light beam is generated by means of a narrow band collimated light source, and this light beam is modulated in accordance with an electrical input signal to be identified. The light beam is then optically scanned at a predetermined scanning rate to produce an optical image of the input signals against a time base. Light from this optical image is passed through a holographic reference transparency, which is a spatial filter corresponding to the Fourier transform of the image of known electrical signals, the light passing through the transparency being fed to a detector. Successive reference transparencies are utilized until correlation between the transparency and the input signal to be identified is indicated by a peaking of the detector output which is sensed by a correlation indicator.

13 Claims, 11 Drawing Figures

OPTICAL CORRELATION OF SCANNED REAL-TIME SIGNALS

This invention relates to the optical correlation of electrical signals to be identified with a library of reference signals, and more particularly to a method and apparatus for enabling such optical correlation of real-time signals.

It has been found that the pattern of an electrical signal can be used to accurately identify the source of such signal. This is a useful tool in a number of applications. Among these is the identification of vehicles by virtue of characteristic vibration patterns they may have, as a means for identifying targets. Characteristic vibration patterns have also been successfully utilized in voice identification, i.e., the identification of individuals by the vibration patterns of their voices in detective work, and the like. Further, characteristic vibration patterns have been used successfully in the analysis of the operation of machinery, characteristic vibration patterns being indicative of a properly operating machine and one that is malfunctioning.

In the prior art, identification by vibration pattern has generally been accomplished by making a photographic transparency of the signal to be identified and then optically comparing this transparency with a bank of transparencies from a library thereof for optical correlation. Sophisticated techniques along these lines using complex spatial filters are described by Vander Lugt, IEEE Trans. Information Theory IT-10, 139 (1964), and Lohmann, Applied Optics 7, 561 (1968). This technique has the disadvantages inherent in the delay involved in making the transparency of the signal to be identified before the correlation can be accomplished. This is particularly disadvantageous in situations where rapid identification of the signal is required, as for example, in identifying targets.

The technique and apparatus of this invention overcomes the aforementioned shortcoming of the prior art in enabling the identification of real-time signals as they are being received without the need for making any photographic image of such signals in order to enable the correlation thereof against a library of transparencies. Further, while it is necessary in correlators of the prior art to precisely align the transparency to be identified with the reference transparency, no such alignment is required in the present device, it being possible to even move the reference transparency while performing the correlation without degrading the correlation measurement as long as such transparency remains within the aperture of the lens system and within reasonable angular orientation. Also, with this invention, it is possible to simultaneously compare the signal to be identified with a number of reference signals.

It is therefore an object of this invention to provide an improved optical correlator in which real-time signals can be directly compared with recordings of reference signals.

It is another object of this invention to lessen the time involved in optical correlation.

It is still another object of this invention to obviate the necessity for recording signals to be identified by optical correlation.

Other objects of this invention will become apparent as the description proceeds in connection with the accompanying drawings, of which:

Briefly described, the technique and apparatus of the invention are as follows: An input signal to be identified is used to modulate a light beam generated by a narrow band collimated light source such as a laser. This beam is then optically scanned by mechanical or electrooptical means so as to produce an optical pattern representing the input signal against a time base. This scanned optical signal is then compared for coincidence with a series of signals on reference transparencies drawn from a library thereof by successively placing such reference transparencies between the scanning light beam and a suitable detector which may comprise an electronic image tube, such as a vidicon, a photosensitive diode array, or some other type of detector capable of performing a time integration of the light falling on the detector at each point and destructive readout after each scanning line has been completed. When there is correlation between the scanning image and the signal of the reference transparency, a peaked output is obtained from the detector, this peaked output providing an actuation signal to a correlation indicator which indicates that a correlation has been achieved. The reference transparencies are in the form of holograms, thus minimizing the effect of dirt or other distortions which may appear in the reference transparencies, or distortions developed in the optical system, which could impair the correlation. The use of holographic transparencies also enables correlation while the reference transparencies are in motion and thus facilitates high speed comparison with a library of transparencies.

Figures 1, 2:
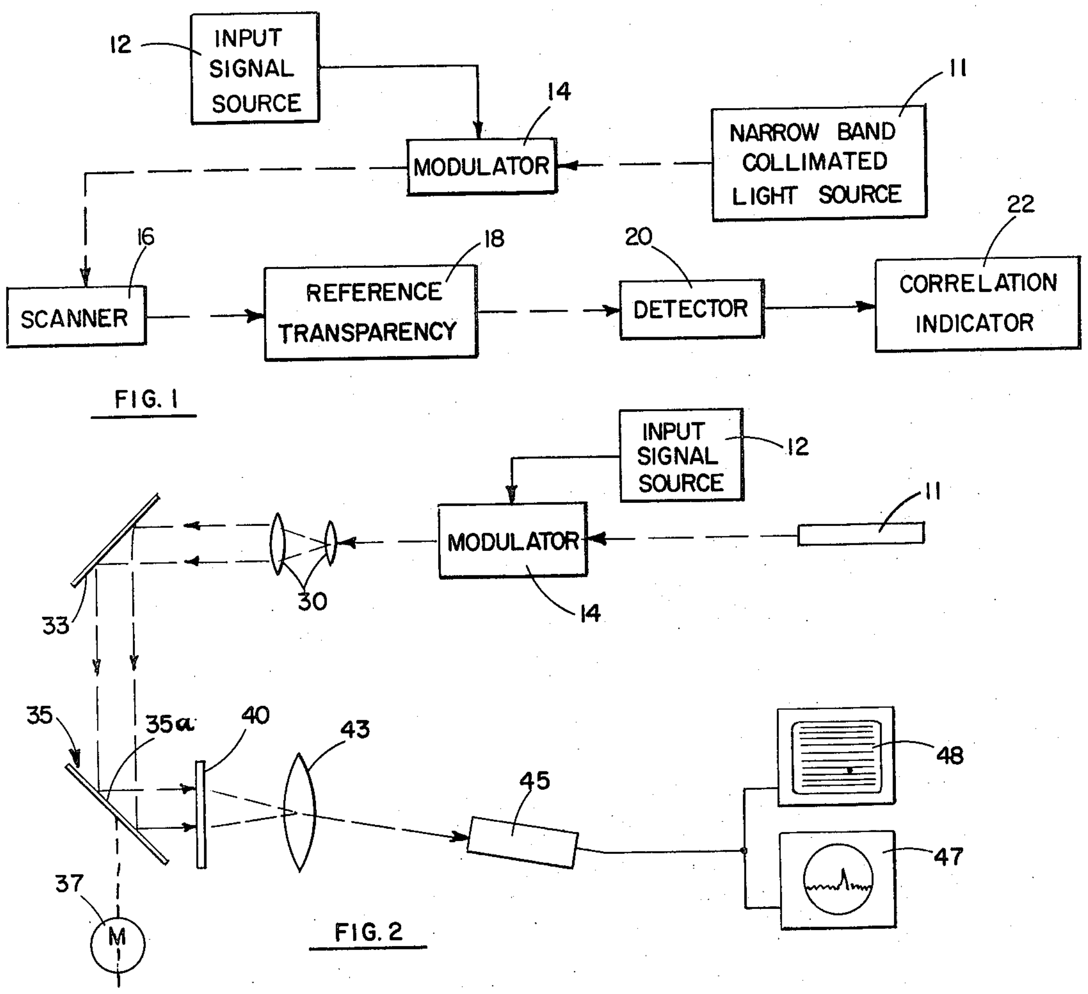
FIG. 1 is a functional block diagram illustrating the basic operation of the system of the invention.
FIG. 2 is a schematic drawing illustrating one embodiment of the system of the invention.

Referring now to FIG. 1, a block diagram illustrating the basic features of the invention is shown. Narrow band collimated light is generated by light source 11 which may comprise a laser. The light output of light source 11 is modulated with the output of input signal source 12 by means of modulator 14. The input signal which is the signal to be identified may be modulated on the light beam in any one of several manners, as to be described further or in the specification.

The modulated light beam is then scanned by means of scanner 16 at a predetermined scanning rate to provide an optical image of the signals against a time base. The light beam is fed from scanner 16 to reference transparency or filter 18 for comparison with the light image of the input. The transparency is in the form of a hologram. Where there is correlation between the light signal of the scanner and a light image of transparency 18, a peaked light output signal is received by detector 20. The output of detector 20 is fed to correlation indicator 22 and this indicator, which may include a visual monitor such as a TV type raster, an oscilloscope or a threshold detector, indicates when detector 20 has a peaked output which represents a correlation condition.

Referring now to FIG. 2, one embodiment of the system of the invention is schematically illustrated. A coherent light beam is fed from laser 11 to modulator 14. Laser 11 may comprise a solid state laser, a gas laser, or a semiconductor light emitting diode of narrow band width. Modulator 14 may comprise an electro-optical modulator using a crystal such as potassium dihydrogen phosphate which employs the Pockels effect. When an electric field is applied to such a crystal, the polarization of the light beam propagating through the crystal is rotated such that the intensity of the light passed therethrough is changed in accordance with the applied voltage. The output of input signal source 12, which is a varying electrical voltage, thus can be used to modulate the light beam. In the case of a laser diode, modulation can be achieved by placing the input signal source in the power supply for the laser to achieve modulation of the light output thereof.

The light beam is fed from modulator 14 through beam expander lens system 30, which expands the spot diameter of the beam to a suitable size for utilization in scanning. The expanded beam is fed by means of mirror 33 onto scanner 35. Scanner 35 may comprise a mechanical scanner which includes a mirror 35a which is rotatably driven by means of a scanner drive motor 37. Other types of mechanical scanning mirrors which may be utilized include an oscillating mirror mounted on a torsional taut band and a mirror mounted on a piezoelectric shear transducer. Acousto-optical scanners which may be utilized are also available.

The scanned light beam is fed through reference transparency 40 which has recorded the image patterns for comparison with that of the input signal. Transparencies 40 may comprise a library of images representing signals from known sources. These images correspond to the Fourier transform of the signals and are in the form of holograms and may be fabricated, as to be explained further on in the specification in connection with FIG. 6. The use of holographic techniques enables the correlation of high resolution images without degradation due to optical imperfections and imperfections in the transparencies which may be occasioned by dirt thereon or smudging thereof. The scanning light beam passed through transparency 40 is focused by means of lens 43 onto the face of vidicon 45 which generates an electrical signal in accordance with the light beam, this electrical signal being applied to oscilloscope 47 and TV type monitor 48 for display. It is to be noted that in FIG. 3, only one scan line is shown on oscilloscope 47, while a plurality of scan lines are shown on monitor 48. A whole series of transparencies 40 is compared with the beam until correlation between one of the signals on one of the transparencies and the input image occurs. At such time, a correlation signal appears on oscilloscope 47 and TV monitor 48 in the form of a peaked signal.

Figure 4A:
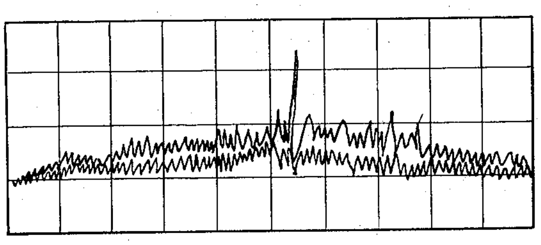
FIGS. 4A and 4B are wave trace diagrams illustrating the operation of the device of the invention.
Figure 4B:
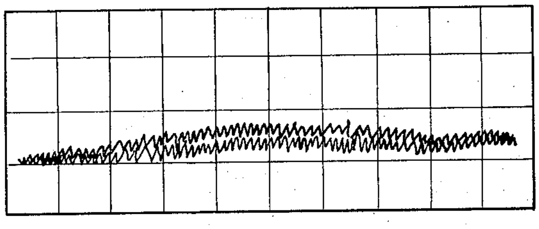

A typical such correlation signal is indicated in FIG. 4A, the sharp peak near the center of the scan line unequivocally indicating such correlation. FIG. 4B shows a typical trace line where there is no correlation.

It is to be noted that with the system of the invention it is not necessary that there be transverse alignment of transparency 40 with the scanning beam and that the transparency can actually be in motion at the time a correlation measurement is made, as long as it is within the optical path of the scan. This enables rapid comparison with a large library of transparencies. It is further to be noted that a single transparency containing a plurality of separate reference traces on successive lines which are all within the light path of the beam can be compared for correlation with the scanning beam simultaneously. It is to be noted that the detector used must operate so as to integrate over on single scan line but destructively erase at the end of each such scan line.

Figure 7:
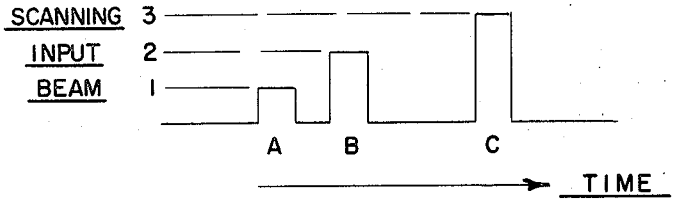
FIG. 7 is a drawing showing an illustration scanning input beam.

Referring now to FIGS. 7 and 8A–8C, the operation of the device of the invention in producing a peaking effect when correlation between the scanning input and the reference transparency occurs, is illustrated. FIG. 7 illustrates a scanning input against a time base, T. This scanning input signal is simplified for illustrative purposes and it should be appreciated that it does not represent a signal which would normally be encountered, such a signal being more in the nature of that shown in FIG. 4B. As shown in FIG. 7, the signal has unity amplitude at time A, twice unity amplitude at time B, and three times unity amplitude at time C.

Figure 8A:
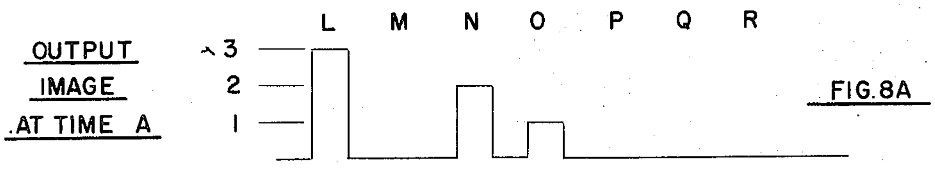
FIGS. 8A–8C are a series of drawings showing output images with the input of FIG. 7 and a corresponding reference transparency.
Figure 8B:
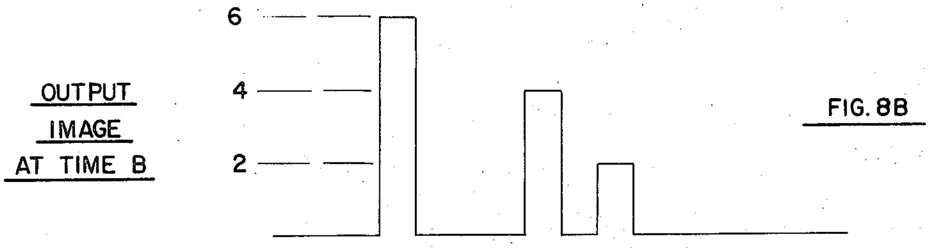
Figure 8C:
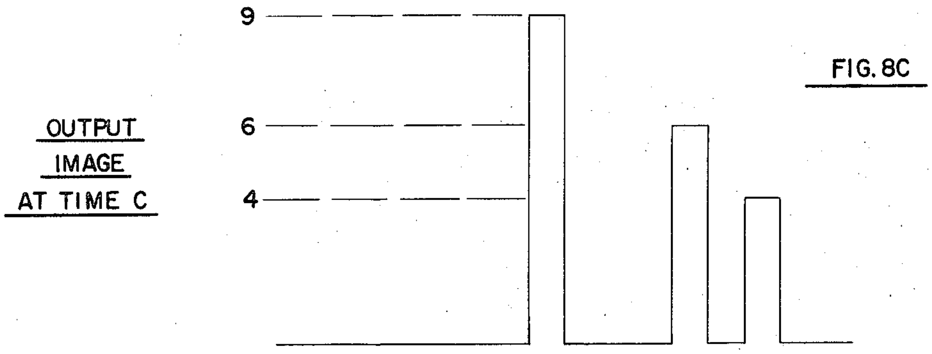

It is assumed for the purposes of this illustration that the reference transparency installed in the system has a holographic pattern which represents the amplitude pattern shown in FIG. 7. FIG. 8A then shows the output image at time A, FIG. 8B shows the output image at time B, while FIG. 8C shows the output image at time C. It can be seen in FIG. 8A that at time A, the filter image has unity amplitude, while the image at time B has twice this amplitude in view of the doubling of the light intensity at time B, while at time C, the image has three times the amplitude of that at time A due to the fact that the light has a three-unit amplitude at time C. The integrated light for the entire scan line shows a light output of three units amplitude in the portion represented by column L, six units amplitude in the portion represented by column M, two units amplitude in the portion represented by column N, 14 units (one unit contributed at time A, four at time B and nine at time C) amplitude in the portion represented by column O, two units amplitude in the portion represented by column P, six units amplitude in the portion represented by column Q, and four units amplitude in the portion represented by column R. There is a sharp peaking in the portions of the signal represented by column O which unequivocally indicates correlation.

Figure 3:
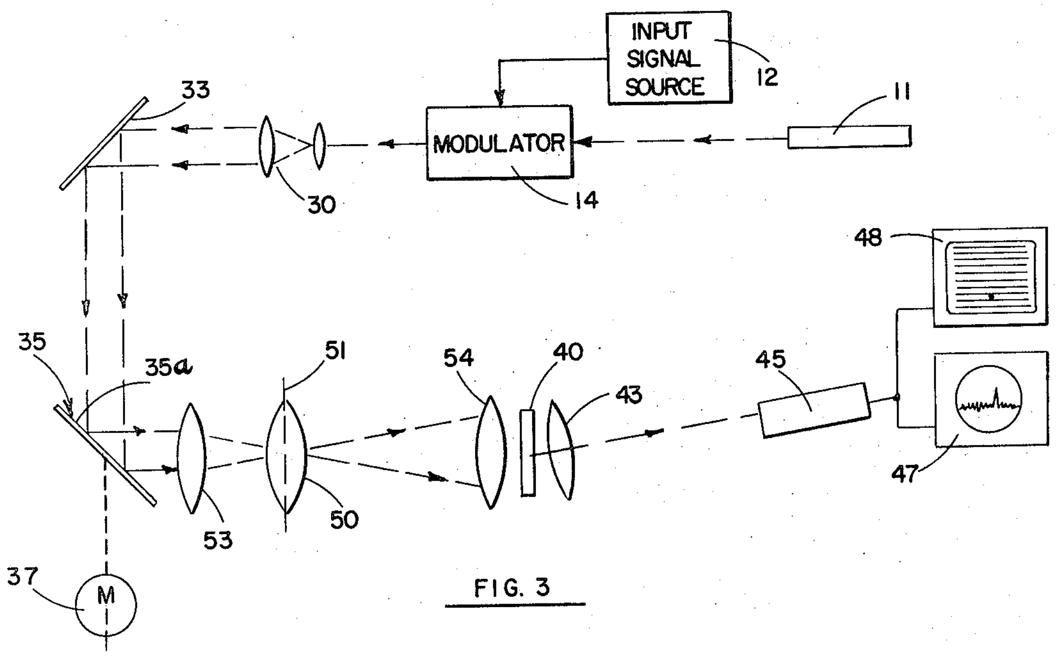
FIG. 3 is a functional schematic of another embodiment of the system of the invention.

Referring now to FIG. 3, a second embodiment of the device of the invention is illustrated. This embodiment is the same as the first except for the location of transparency 40 and the optics used. This embodiment has the advantage of permitting the insertion of a transparency at the optical input plane 51 in place of lens 50 to verify the operation of the system without using a modulated input signal. Thus, a transparency having a predetermined image pattern can be substituted for the lens and this pattern used to modulate the scanning beam as it passes therethrough, this then being used to check out the operation of the system against reference transparencies 40. Lenses 53 and 54 are used in conjunction with lens 50 to focus the beam.

Figure 5:
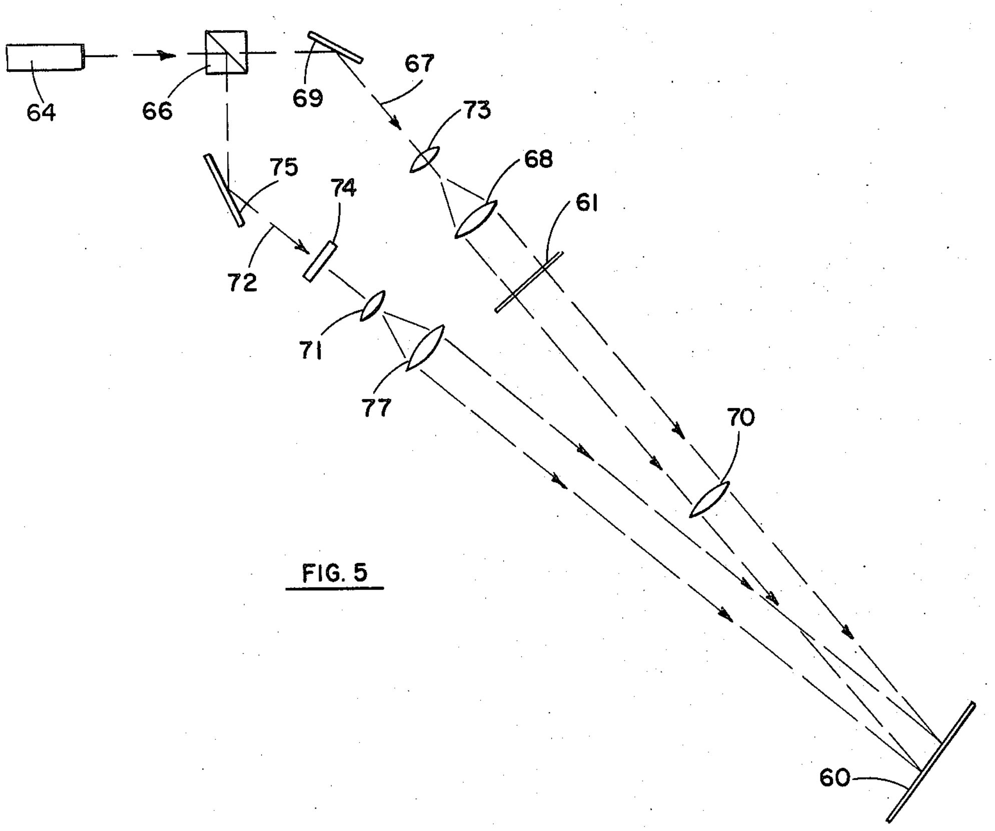
FIG. 5 is a schematic drawing illustrating the fabrication of a reference transparency for use in the system of the invention.
Figure 6:
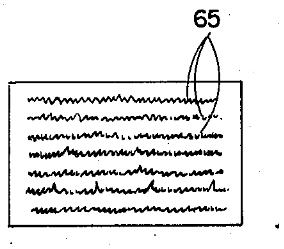
FIG. 6 is an illustration of a typical reference signal transparency which may be utilized in the system of the invention.

Referring now to FIGS. 5 and 6, a technique for fabricating reference transparencies for use in the system of the invention is schematically illustrated. As already mentioned, the reference transparencies are in holographic form. The holographic transparency is fabricated from a signal transparency 61 which is illustrated in FIG. 6, and is a representation of a plurality of separate amplitude varying signals 65, each against a separate time base, as would appear on the sweep line of an oscilloscope. The time bases for all of the signals must of course all correspond to the scan used in correlating the real-time signal against the reference signal. A coherent light beam generated by laser 64 is split into two components by means of beam splitter 66. One of these beam components, 67, is reflected by mirror 69, expanded and collimated by means of lenses 73 and 68 and then passed through the reference signal transparency 61. The beam is then passed through collimating lens 70, from where it is directed onto photosensitive film plate 60. The other beam component 72 is reflected by means of mirror 75 and directed through a neutral density filter 74 to change the intensity of the laser beam for optimum recording of the signals. The beam is then expanded and collimated by means of lenses 71 and 77 and directed towards film plate 60 where it is used as the reference beam in forming the holographic image. Film plate 60 after being appropriately exposed is developed to form a holographic transparency representing the various reference signals. This holographic transparency, which is a complex spatial filter as described by Vander Lugt in his aforementioned paper, can then be used as a reference transparency 40 of FIGS. 2 and 3.

The system of the invention thus provides means for rapidly identifying real-time "on the air" signals against a bank of references for correlation therewith.

While the invention has been described and illustrated in detail, it is to be clearly understood that this is intended by way of illustration and example only and is not to be taken by way of limitation, the spirit and scope of this invention being limited only by the terms of the following claims.

We claim:

1. A system for correlating signals to be identified against reference signals comprising:

means for generating a narrow band collimated light beam, means for modulating the signals to be identified on said light beam, a holographic reference transparency having the Fourier transform of said reference signals recorded thereon against a predetermined time base, means for scanning the beam at a scanning rate corresponding to that of the time base of the reference transparency, said scanning beam being directed to pass through said transparency to scan said transparency on a point by point basis, means for detecting the light beam after it has passed through said transparency, said detecting means integrating the light incident on each point thereof, and indicator means responsive to the output of said detecting means for indicating when there is a correlation between the signal to be identified and a signal recorded on said transparency, the output of said detector being peaked when such correlation occurs.

2. The system of claim 1 wherein said detector means comprises an electronic image tube.

3. The system of claim 2 wherein said correlation indicator means comprises an oscilloscope for receiving the output of said image tube.

4. The system of claim 2 wherein said correlation indicator means comprises a TV monitor.

5. The system of claim 1 wherein said means for generating said light source comprises a laser.

6. The system of claim 1 wherein said scanner comprises a mirror and means for periodically driving said mirror at the predetermined scanning frequency.

7. The system of claim 6 wherein the beam passes directly from said scanner mirror through said reference transparency and further including a lens receiving the light output of said transparency and focusing said light output onto said detector means.

8. The system of claim 6 and further including a lens system interposed between said scanner mirror and said transparency for directing the light through the transparency.

9. The system of claim 8 wherein said lens system includes a lens located at the optical input plane of said reference transparency and means for substituting a transparency for said last mentioned lens to simulate the input signal.

10. A method for identifying a signal against a library of reference signals comprising the steps of:

modulating the signal to be identified onto a narrow band collimated light beam, scanning said light beam at a predetermined scanning rate, passing said scanned beam in succession through each of a plurality of holographic reference transparencies from said library of transparencies to scan said transparencies on a point by point basis, said reference transparencies having images thereon of signals recorded against a time base at said predetermined scanning rate, detecting the light after it has passed through each of said reference transparencies and displaying the detected signals on an indicator, and observing the signals on said indicator for a peaking thereof which is indicative of correlation between the signal to be identified and a reference signal recorded on one of the transparencies.

11. The method of claim 10 wherein said light beam is generated by means of a laser.

12. The method of claim 10 wherein the detected signals are displayed on the scanning line of an oscilloscope.

13. The method of claim 10 wherein the detected signals are displayed on the raster of a TV type raster.

* * * * *